(12) United States Patent
Gallez et al.

(10) Patent No.: US 9,056,793 B2
(45) Date of Patent: Jun. 16, 2015

(54) GYPSUM MATERIALS

(71) Applicant: Dow Corning Corporation, Midland, MI (US)

(72) Inventors: Laurence Gallez, Erbisoeul (BE); Jean-Paul Lecomte, Brussels (BE); Marie-Jose Sarrazin, Waterloo (BE); Marc Thibaut, Chapelle-Lez-Herlaimont (BE)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 14/092,360

(22) Filed: Nov. 27, 2013

(65) Prior Publication Data

US 2014/0142215 A1    May 22, 2014

Related U.S. Application Data

(62) Division of application No. 12/944,268, filed as application No. PCT/EP2009/056349 on May 26, 2009, now abandoned.

(30) Foreign Application Priority Data

May 27, 2008  (GB) .................................. 0809526.7
May 26, 2009  (WO) ................. PCT/EP2009/056349

(51) Int. Cl.
| C04B 20/10 | (2006.01) |
| C04B 24/42 | (2006.01) |
| C04B 28/14 | (2006.01) |
| C04B 40/00 | (2006.01) |
| C04B 103/65 | (2006.01) |

(52) U.S. Cl.
CPC ........ C04B 20/1051 (2013.01); *Y10T 428/2995* (2015.01); *Y10T 428/2993* (2015.01); C04B 24/42 (2013.01); C04B 28/14 (2013.01); C04B 40/0042 (2013.01); *C04B 2103/65* (2013.01)

(58) Field of Classification Search
USPC .................................. 106/781; 428/404, 405
See application file for complete search history.

(56) References Cited

U.S. PATENT DOCUMENTS

| 626,843 | A | 6/1899 | Richardson |
| 5,766,323 | A | 6/1998 | Butler et al. |
| 6,268,423 | B1 | 7/2001 | Mayer et al. |
| 7,311,770 | B2 | 12/2007 | Windridge et al. |
| 7,410,538 | B2 | 8/2008 | Butler et al. |
| 8,431,646 | B2 | 4/2013 | Giessler-Blank et al. |
| 8,445,560 | B2 | 5/2013 | Lecomte et al. |
| 2005/0098062 | A1 * | 5/2005 | Butler et al. ..................... 106/2 |

FOREIGN PATENT DOCUMENTS

| EP | 0496510 A1 | 7/1992 |
| EP | 0811584 A1 | 12/1997 |
| EP | 0919526 A1 | 6/1999 |
| EP | 1544142 A1 | 6/2005 |
| EP | 1982964 A1 | 10/2008 |
| GB | 1217813 | 12/1970 |
| GB | 1533142 | 11/1978 |
| GB | 1544142 | 4/1979 |
| JP | 6329457 A | 11/1994 |
| WO | WO 0032533 A1 | 6/2000 |
| WO | WO 0230846 A1 | 4/2002 |
| WO | WO 0230847 A1 | 4/2002 |
| WO | WO 2008062018 A1 | 5/2008 |
| WO | WO 2008071710 A1 | 6/2008 |

OTHER PUBLICATIONS

English language abstract for EP 0919526 extracted from espacenet.com database Jun. 23, 2011, 33 pages.
English language abstract for EP 1982964 extracted from espacenet.com database Jun. 23, 2011, 43 pages.
English language translation for JP 6329457 extracted from JAP database Jun. 23, 2011, 33 pages.
International Search Report for Application No. PCT/EP2009/056349 dated May 26, 2009, 4 pages.

* cited by examiner

*Primary Examiner* — Vickey Nerangis
(74) *Attorney, Agent, or Firm* — Baltazar Gomez

(57) ABSTRACT

The present invention relates to hydrophobic gypsum and to a process for making gypsum hydrophobic, in particular it relates to a powdered hydrophobing additive, a hydrophobic gypsum composition and method for preparing same using granules containing organosilicon compounds as hydrophobing additives. The invention provides a granulated additive for rendering gypsum material hydrophobic, comprising a particulate carrier on which is deposited an organosilicon component, a binder polymer and an emulsifier for the organosilicon component.

Such a granulated hydrophobic additive is able to provide a high initial hydrophobicity to gypsum materials to which it is applied and that the obtained hydrophobicity can last during a long period of time.

18 Claims, No Drawings

GYPSUM MATERIALS

RELATED APPLICATIONS

This application is a divisional of U.S. Ser. No. 12/994,268, filed on Mar. 24, 2011, which claims priority to and all the advantages of International Patent Application No. PCT/EP2009/056349, filed on May 26, 2009, which claims priority to Great Britain Patent Application No. GB 0809526.7, filed on May 27, 2008.

The present invention relates to hydrophobic gypsum and to a process for making gypsum hydrophobic, in particular it relates to a powdered hydrophobing additive, a hydrophobic gypsum composition and method for preparing same using granules containing organosilicon compounds as hydrophobing additives.

Gypsum is a soft mineral made of hydrated calcium sulphate usually calcium sulfate dihydrate, with the chemical formula $CaSO_4 \cdot 2H_2O$. It is often used as drywall, plaster ingredient, fertilizer, soil conditioner, cement component. The gypsum may further include organic material (for example cellulosic or paper) or mineral/glass fibres in admixture to modify its physical properties, or any other additive common to gypsum formulations.

Water-resistance is considered to be an important factor in the production of building products containing gypsum, for example plasterboard, gypsum blocks, moldings, gypsum coatings and the like. Adsorption of water can cause staining, mildew, expansion, and general deterioration and degradation of gypsum products. It is particularly difficult to provide gypsum products which may be utilized on external walls, due to the effects of the weather. Various techniques have been proposed to render gypsum products more hydrophobic, for example by way of surface treatment with a hydrophobing agent, i.e. spraying, brushing or rolling a hydrophobing agent onto a gypsum based substrate, by immersing the substrate in a solution of hydrophobing agent, or by admixing a hydrophobing agent into gypsum powder prior to formation of a gypsum based product, for example prior to molding blocks, forming boards or covering walls.

Surface treatment using a hydrophobing agent is a convenient means of increasing the water repellency of a preformed substrate, such as a pre-molded gypsum block or plasterboard. However, after such a treatment the hydrophobing agent tends to be only dispersed in the surface layers of the substrate with the bulk of the substrate material remaining substantially untreated.

An alternative method for rendering a substrate water repellent is to admix a hydrophobing agent into the substrate material, such as gypsum powder, prior to molding blocks, forming boards or covering walls or other structures.

WO 02/30847 describes a gypsum composition containing:
gypsum;
a granulated hydrophobing additive comprising an organopolysiloxane containing silicon bonded hydrogen, a water soluble or water dispersible binder and a carrier, and
a pH effecting additive in an amount sufficient to maintain the pH of the composition between 8 and 12.5 in the presence of water. This additive is preferably lime.

While effective to impart hydrophobicity, a SiH containing compound reacts in presence of water to produce Hydrogen therefore requires forming the powdered additive in absence of water. Furthermore, undesired bubbles are likely to appear when a blend of gypsum powder and granulated additive is contacted with water.

EP 0811584 describes cementitious material in powder form comprising cement, and a granulated hydrophobing additive, which comprises from 5 to 15 parts by weight of an organopolysiloxane component, from 10 to 40 parts by weight of a water-soluble or water-dispersible binder and from 50 to 80 parts by weight of a carrier particle, to give from 0.01 to 5% by weight of the organosiloxane component based on the weight of the cement. The binder is typically in form of a wax at ambient temperature therefore must be heated to provide a molten form to coat the carrier. Moreover, the hydrophobicity provided by such additive requires subsequent wettings of the applied cementitious material to a substrate to be fully effective.

According to EP 0 811 584, the organosiloxane component is composed mainly of di-functional siloxane units. Such composition is well adapted for hydrophobicizing cement but less for gypsum, as will be shown in a comparative example of this specification.

GB1217813 describes a process for the manufacture of water-repellency agents wherein quicklime (CaO) is slaked with an aqueous emulsion of at least one organopolysiloxane which on average contains 0.8 to 1.8 Si C— bonded hydrocarbon radicals per silicon atom, and the products thus obtained, if they are not already pulverulent, are dried and, if necessary, ground. Such water-repellency agents manufactured can be added to compositions based on lime (CaO or Ca(OH)2), for example lime mortar and lime paints, Portland cement, finishing plaster and waterglass paints, for example distempers.

GB1544142 describes a process for the manufacture of a waterrepellency agent, which comprises slaking quicklime with an aqueous emulsion of an organopolysiloxane containing an average of from 0 8 to 1 8 silicon-bonded hydrocarbon radicals per silicon atom, at least one mole of water being used per mole of quicklime and the slaking being carried out in the presence of a protective colloid and a surfactant salt of an acid of the general formula R—Oa, —SO3H in which R denotes an unsubstituted or substituted monovalent hydrocarbon radical and a denotes zero or one, and, if the product is not already pulverulent, subsequently drying and, if necessary, grinding the product. Quicklime (Ca O), which is also known as "burnt lime" and "calcium oxide may be used in the form of lime lumps or of finely divided lime (pulverulent quicklime).

Lime is a highly alkaline solid, caustic and leading to skin irritation during its utilisation and to poor ageing of the finished material.

WO 0032533A describes a porous inorganic granular material eg foamed ceramic material produced from calcined aluminosilicate upon having a water resistant coating thereon provided by a first coating material comprising a hydrophobic polymeric material and, deposited on the first coating material, a second coating material which renders the ceramic foam material coated by the first coating material more water wettable. The first coating material may comprise a silicon containing hydrophobic compound or composition, eg a silane or siloxane. The second coating material may comprise a latex polymeric material. This is not a granulated additive able to impart hydrophobicity to gypsum.

JP 6329457 describes a hydraulic composition containing (a) a hydraulic substance, (b) mica powder treated with a silane compound and a vinylic polymer, (c) the powder of a polyvinyl alcohol polymer, and (d) reinforcing fibers.

U.S. Pat. No. 626,843 describes building compositions comprising hydrophobicizing powders which contain (A) silica as support material and (B) a hydrophobicizing component which is liquid at 10° C. and comprises one or more organosilicon compound(s). The hydrophobicizing component may further comprise water and small amount of emulsifier, typically 0.5 to 5% by weight of hydrophobicizing component (B). Such silica-based powder is said to provide a quick hydrophobicizing action and low tendency to caking due to the absence of re-emulsifiable constituents. However, such powder is not easily dispersible in water.

It has, for a long time, been considered by the building trade that whilst products containing a high proportion of gypsum are suitable for internal building their use in external masonry and rendering products is unacceptable due to the water absorbent properties of gypsum. One reason for this is that whilst the pre-mixing of a hydrophobing additive with gypsum, in the absence of water, results in a substantially uniform dispersion of hydrophobing additive throughout the mixture, upon the introduction of water the hydrophobing agent tends to migrate away from the water towards the gypsum air interface resulting in a concentration of hydrophobic agent on the outer surface of a gypsum block, i.e. at the interface with air. This migration effect results in the presence of very little hydrophobing agent in the inner body of blocks of gypsum and as such it has previously proved very difficult, if not impossible, to maintain a uniform dispersion of hydrophobing additive throughout a gypsum block, subsequent to wetting. There still remains a long felt need to be able to make gypsum sufficiently hydrophobic in order for it to be used in external wall applications.

It has been desirable for gypsum materials, which have been applied to a substrate, such as an external wall, to be, to some extent hydrophobic. A number of solutions have been suggested in the past including the post-treatment of previously applied gypsum material and the addition of hydrophobing additives to gypsum materials prior to their application to a substrate. In the most common situations hydrophobing additives are added immediately prior to or during the process of applying the gypsum material to a substrate. It is, however, preferred to provide a gypsum material which has incorporated therein a hydrophobing agent or additive prior to application to a substrate, even more preferably at the stage where the gypsum material is in a dry, powdery form.

It is desirable to provide hydrophobing additives able to be easily dispersible in water so as to be useful not only in producing boards but also in producing coatings from powder materials mixed with water while providing a quick hydrophobicizing action to gypsum material and maintain this action over time.

In one embodiment, the invention provides a granulated additive for rendering gypsum material hydrophobic, comprising a particulate carrier on which is deposited an organosilicon component, a binder polymer and an emulsifier for the organosilicon component.

It is to be understood that the concept of "comprising" where used herein is used in its widest sense to mean and to encompass the notions of "include", "comprehend" and "consist of".

It has been observed that such a granulated hydrophobic additive is able to provide a high initial hydrophobicity to gypsum materials to which it is applied and that the obtained hydrophobicity can last during a long period of time.

The organosilicon component can have the formula:
—R3Si—O—[R'2SiO]a-[R"R'SiO]b-[R"2SiO]C—Si—R3
wherein each R substituent may be the same or different and is selected from the group of hydroxyl, alkyl, alkenyl, aryl, alkyl-aryl, aryl-alkyl, alkoxy, aryloxy and hydrogen, each R' substituent may be the same or different and is selected from the group of hydroxyl, hydrogen, a hydrocarbon group or substituted hydrocarbon group, OR where R'" is a hydrocarbon group with 1 to 6 carbon atoms, each R" substituent is an organopolysiloxane chain of the formula O—[R'2SiO]x-SiR3; a is an integer, b, c and x are zero or integers whereby the total of b+c is no more than 10% of the total of a+b+c+x and less than 10% of the cumulative total of R+R' substituents are hydrogen.

The organosilicon component is preferably free of organopolysiloxane having Si bonded hydrogen. The granulated additive is then safer to produce and provides reduced level of gas bubbling in the treated gypsum which is beneficial for its physical properties, resistance and esthetical appearance.

Such a granulated hydrophobic additive is also able to be easily dispersed in water especially when the binder polymer is water soluble or water-dispersible polymer, as preferred.

Preferably, the particulate carrier is of a nature different from silica. We observed that silica particles often have a higher surface area than other carrier particles therefore tend to "anchor" (react or adsorb) the organosilicon material in the powdered additive making the organosilicon additive unavailable to hydrophobing gypsum. This characteristic of silica imparts a lower level of hydrophobicity for a defined amount of organosilicon component. Besides, compared to other carrier particles, for example zeolite, silica is more expensive which adds even more to the manufacturing cost of the hydrophobing additive.

Lime is preferably avoided as carrier for safety and stability reasons, as its highly alkaline character often leads to poor ageing of the granulated additive.

The carrier particles may be water-insoluble, water-soluble or water-dispersible.

The carrier particle is preferably chosen amongst silicates, preferably magnesium silicates like mica, talc, sepiolite, calcium silicate such as wollastonite, phyllosilicates, aluminosilicates, preferably zeolite or metakaolin, fly ash, clay materials, calcium carbonates, calcium magnesium carbonate such as dolomite, methyl cellulose, carboxy methyl cellulose, polystyrene beads, sulphates including sodium sulfate, calcium sulfate, magnesium sulfate, magnesium oxide, diatomite or calcinated diatomite, calcinated rice and starch residues (e.g. Rice Hulls ash), and stearates. It is preferred to use materials which fulfil a useful role in gypsum compositions per se, for example gypsum itself.

It is preferred that the carrier particles have a mean diameter of from 0.1 to 5000 micrometers, more preferably 0.1 to 1000 micrometers, most preferably 0.1 to 50 micrometers.

Preferably, the weight ratio of binder versus organosilicon component is comprised between 10:100 and 50:100, preferably between 10:100 and 30:100.

In a process according to the invention for preparing a granulated hydrophobing additive for gypsum material comprising an organosilicon component and a binder polymer deposited on a particulate carrier, the organosilicon component and binder polymer are applied to the particulate carrier from an aqueous emulsion.

In a further embodiment, the invention provides a granulated hydrophobing additive for gypsum material prepared by this process.

A gypsum material in powder form can be produced, comprising dry gypsum and a granulated hydrophobing additive as defined above, in an amount sufficient to give from 0.01 to 2% by weight of the organosilicon component based on the weight of dry gypsum.

The invention further provides a process for imparting to gypsum material a hydrophobic character, comprising mixing into the gypsum material a granulated hydrophobing additive as define above.

A granulated additive is a product resulting from the agglomeration of small size particles, which for example can have a size between 20 and 1000 microns. A granule is typically formed of different components agglomerated or glued together in a single particle, as opposed to ordinary powder additive where solid powder components are physically mixed together so that each component remains as a separate, individual particle.

A granulated additive according to the invention for rendering gypsum material hydrophobic comprises an organosilicon component and a binder polymer deposited on a particulate carrier, and an emulsifier for the organosilicon component is deposited on the particulate carrier together with the organosilicon component and the binder.

Preferably, the organosilicon component comprises a silane, an organosiloxane, a condensation product of one or several silane compound, or a mixture thereof.

The organosilicon component may comprise a silane compound of the formula Si (OZ')4, ZSi(OZ')3 or Z2Si(OZ')2 in which Z represents an alkyl, substituted alkyl, aryl or substituted aryl group having 1 to 20 carbon atoms and each Z' represents an alkyl group having 1 to 6 carbon atoms. Preferably Z represents an alkyl, substituted alkyl, aryl or substituted aryl group having 4 to 18 carbon atoms.

The organosilicon component may comprise a condensation compound obtained by the hydrolysis-condensation of any combination of compounds of the formula Si(OZ')4, ZSi(OZ')3 or Z2Si(OZ')2, in which Z represents an alkyl, substituted alkyl, aryl or substituted aryl group having 1 to 20 carbon atoms and each Z' represents an alkyl group having 1 to 6 carbon atoms.

Preferably, the organosilicon component comprises alkoxysilyl groups having 1 or 2 carbon atoms, preferably 1 carbon atom (methoxysilyl groups).

The organosilicon component can contain an organopolysiloxane. This may be chosen from any known organopolysiloxane materials, i.e. materials which are based on a Si—O—Si polymer chain and which may comprise monofunctional, di-functional, tri-functional and/or tetra-functional siloxane units, many of which are commercially available. It is preferred that the majority of siloxane units are di-functional materials having the general formula RR'SiO2/2, wherein R or R' independently denotes an organic component or an amine, hydroxyl, hydrogen or halogen substituent. Preferably R will be selected from hydroxyl groups, alkyl groups, alkenyl groups, aryl groups, alkyl-aryl groups, arylalkyl groups, alkoxy groups, aryloxy groups and hydrogen. More preferably a substantial part, most preferably a majority of the R substituents will be alkyl groups having from 1 to 12 carbon atoms, most preferably methyl or ethyl groups. The organopolysiloxane can for example be polydimethylsiloxane (PDMS). Alternatively the organopolysiloxane may comprise methylalkylsiloxane units in which the said alkyl group contains 2-20 carbon atoms. Such methylalkylsiloxane polymers, particularly those in which the said alkyl group contains 6-20 carbon atoms, may confer even higher water resistance than PDMS. Blends of organopolysiloxanes can be used, for example a blend of a methylalkylsiloxane polymer with a linear PDMS.

Preferably, some of the R groups of the organopolysiloxane are alkyl groups bearing a trialkoxysilyl moiety to provide appropriate reactivity of the resultant organosiloxane component towards gypsum materials. The trialkoxysilyl moieties have the general formula (RO)3SiO1/2, where R can be a alkyl group having from 1 to 4 carbon atoms. Trialkoxygroups can for example be introduced by a hydrosilylation reaction between an organopolysiloxane containing one or more Si—H groups and an allyl or vinyl trialkoxysilane.

Although it is preferred that the majority of siloxane units are di-functional siloxane units other units such as tri-functional or tetra-functional units may also be present resulting in the polymer chain exhibiting a certain amount of branching. Preferably at least 10% of the siloxane units are tri or tetra-functional units. For example resinous organopolysiloxane materials may be used such as a condensation product of a partially hydrolysed trialkoxysilane such as n-octyl trimethoxysilane or n-octyl triethoxysilane. Blends of such resinous organopolysiloxane materials with a linear polyorganosiloxane such as PDMS can be used.

In a preferred embodiment, the organosilicon component comprises a dialkoxysilane, trialkoxysilane, or a mixture of these with each other or with an organopolysiloxane. The dialkoxysilane generally has the formula Z2Si(OZ')2 and the trialkoxysilane generally has the formula ZSi(OZ')3 in which Z in each formula represents an alkyl, substituted alkyl, aryl or substituted aryl group having 1 to 20 carbon atoms and each Z' represents an alkyl group having 1 to 6 carbon atoms. The group Z can for example be substituted by a halogen, particularly fluoro, group, an amino group or an epoxy group, or an alkyl group can be substituted by a phenyl group or a phenyl group can be substituted by an alkyl group. Preferred silanes include those in which Z represents an alkyl group having 4 to 18 carbon atoms and each Z' represents an alkyl group having 1 to 4, particularly 1 or 2, carbon atoms, for example n-octyl trimethoxysilane, 2-ethylhexyl triethoxysilane or n-octyl trimethoxysilane.

We have found that blends of such preferred silanes with an organopolysiloxane can form highly advantageous hydrophobing additives when granulated via an emulsion according to the present invention.

Preferably, the organosilicon component comprises alkoxysilyl groups and akylsilyl groups.

Preferably, the organosilicon component comprises 2 components:
a compound of the formula Si(OZ')4, ZSi(OZ')3 or Z2Si(OZ')2 in which Z represents an alkyl, substituted alkyl, aryl or substituted aryl group having 1 to 20 carbon atoms, preferably 4 to 18 carbon atoms and each Z' represents an alkyl group having 1 to 6 carbon atoms and a condensation compound obtained by the hydrolysis-condensation of any combination of compounds of the formula Si(OY')4, YSi(OY')3 or Y2Si(OY')2 in which Y represents an alkyl, substituted alkyl, aryl or substituted aryl group having 1 to 20 carbon atoms and each Y' represents an alkyl group having 1 to 6 carbon atoms.

The binder polymer is a film forming material which aids in binding the organosilicon component to the particulate carrier. The binder polymer can be either water-soluble or water-insoluble, that is it can be either dissolved or emulsified in water in the aqueous emulsion of the organosilicon component that is applied to the carrier. Such binder materials (either water soluble or water insoluble) are preferably materials which at room temperature, i.e. from 20 to 25° C., have a solid consistency. Examples of suitable water-soluble or water-dispersible binder materials include polyvinyl alcohols, methyl cellulose, carboxy methyl cellulose, polycarboxylates and other film forming polymers. Examples of suitable water-insoluble but water-dispersible (emulsifiable) binder materials include polymers such as polyvinyl acetate, vinyl acetate ethylene copolymers and acrylate ester polymers. Blends of binder material as described above can be used, for example a blend of a water-soluble binder polymer such as polyvinyl alcohol with a water-insoluble binder polymer such as polyvinyl acetate. Water dispersion of the resultant granules may be facilitated by the appropriate blend of water soluble and water insoluble binder material. Most preferably the water solubility of the binder material should be such that it does not interfere with the hydration process of the gypsum material when water is added to the gypsum material prior to its application or use. The binder may also play a role of encapsulating the active compound (organosilicon component) during storage, impeding an undesired reaction during storage and preserving the delivery of hydrophobing properties. The binder polymer is useful to improve aging properties of the granules and helps to provide easy and fast dispersion of the granules in water.

The organosilicon component and binder polymer are applied to the particulate carrier from aqueous emulsion. The emulsifier present can for example be a nonionic, anionic, cationic or amphoteric emulsifier. Examples of non-ionic emulsifiers include polyvinyl alcohol, ethylene oxide propylene oxide block copolymers, alkyl or alkaryl polyethoxylates in which the alkyl group has 8 to 18 carbon atoms, alkyl polyglycosides or long chain fatty acids or alcohols. Some water-soluble polymers such as polyvinyl alcohol can thus act as both binder polymer and emulsifier. In some preferred emulsions polyvinyl alcohol acts as emulsifier and also as part of the binder polymer together with a water-insoluble polymer such as polyvinyl acetate. Examples of anionic surfactants include alkali metal and ammonium salts of fatty acids having 12 to 18 carbon atoms, alkaryl sulphonates or sulphates and long chain alkyl sulphonates or sulphates. Examples of cationic surfactants include quaternary ammonium salts containing at least one long chain alkyl group having 8 to 20 carbon atoms.

Preferably, the emulsifier and the binder are polyvinyl alcohol.

Preferably, the weight ratio of binder versus organosilicon component is comprised between 10:100 and 50:100, preferably between 10:100 and 30:100. This helps to ensure an appropriate binding effect of the binder polymer and helps to protect the active component from premature reaction.

The granulated hydrophobing additive preferably comprises 50 to 85% by weight particulate carrier, from 1 to 10% by weight binder polymer and from 5 to 35% organosilicon component.

Although it is preferred that the granulated hydrophobing additives consist only of the carrier particles, binder(s) and organosilicon component, additional ingredients may be included, for example viscosity modifiers, pigments, colorants, preservatives, gelling agents, pH modifiers, buffers, accelerators, retarders, air entrainers or fillers, e.g. silica and titanium dioxide. It is however preferred that such additional optional ingredients do not comprise more than 5% by weight of the total weight of the additive.

The carrier particles are agglomerated with the organosilicon-binder emulsion potentially in the presence of a co-binder. The main advantage of using an agglomeration process to get an organosilicon-based powder is to get particles which are relatively porous as compared with a spray drying process. The porosity of the powder combined with the use of a water soluble binder enables the powder to be easily redispersible in the application.

It is essential that the hydrophobing additive is granulated, which means that it has been prepared by a granulation process. Granulation methods have been described in a number of patent specifications including EP 0811584 and EP 496510. In the granulation process, the organosilicon component must be emulsified or at least dispersed in the aqueous solution or emulsion of the water-soluble or water-insoluble binder. The resultant emulsion is deposited in a liquid form, for example by spraying, onto the carrier particles e.g. in a fluid bed, thus causing the organosilicon component and binder in admixture to solidify, through the evaporation of water, onto the carrier particles and form a free flowing powder.

In another granulation method the emulsion of organosilicon component and binder polymer is sprayed simultaneously into a drum mixer containing the carrier. The spray droplets partially evaporate on contact with the carrier particles. After mixing, the particles are transferred to a fluidised bed where evaporation is completed with ambient air. The granulated hydrophobing additive is then collected from the fluidised bed. Typical apparatus which is useful for granulation includes the Eirich® pan granulator, the Schugi® mixer, the Paxeson-Kelly® twin-core blender, the Lödige® ploughshare mixer, the Lödige® Continuous Ring Layer Mixer or one of the numerous types of fluidised bed apparatuses, e.g. Aeromatic® fluidised bed granulator. Optionally the particles may be further screened by sieving to produce particles of hydrophobing additive substantially free of any undersized or oversized material.

The amount of granulated hydrophobing additive which is present in the gypsum material according to the invention is such that from 0.01 to 2% by weight of the organosilicon component is present based on the dry weight of gypsum. More preferably the amount of additive is preferably from 0.25 to 5% by weight of gypsum and the amount of organosilicon component is 0.05 to 1% by weight based on the weight of gypsum.

A process according to the invention of imparting to gypsum material a hydrophobic character comprises mixing into the gypsum material a granulated hydrophobing additive as described above. Mixing may be done by mechanical means or any other appropriate method known in the art. Mixing can conveniently be carried out by dry mixing the granulated hydrophobing additive with the gypsum material at the stage where is in a dry, powdery form. Alternatively the hydrophobing additives can be added during or after hydration of the gypsum, for example immediately prior to or during the process of applying the gypsum material to a substrate.

There now follows a number of examples which illustrate the invention. All parts and percentages are given by weight unless otherwise indicated.

Preparation of Powdered Hydrophobing Additive

EXAMPLE 1

Octyltrimethoxysilane 300 g of zeolite (DOUCIL 4A from INEOS), having a particle size of about 2 to 5 μm was placed into a domestic kitchen food mixer. 75 grams octyl trimethoxysilane was mixed in 75 g of an aqueous polyvinyl alcohol solution 20% solid (Mowiol 4/88 from Kuraray, Höppler viscosity: 3; 5-4 mPas, 88% hydrolysis) for 3 minutes with a rotor/stator mixer (Ultraturrax). The resultant creamy emulsion was poured over the zeolite in the food mixer under agitation (at maximum mixer speed within a period of 15-30 seconds resulting in a granulated powder). The granulated powder was dried in a fluidised bed for 15 minutes and sieved to remove any particles larger than 0.5 mm diameter.

EXAMPLE 2

Hydrolysed Silane: Dimethylsiloxane with Methylsilsesquioxane and n-Octyl Silsesquioxane Methoxy Terminated An emulsion made of dimethylsiloxane with methyl silsesquioxane and n-octyl silsesquioxane methoxy terminated (105.6 g), 26.4 g of 20% solution of re-dispersible polyvinylalcohol (Mowiol 4/88 from Kuraray was prepared by mixing the different components with a rotor/stator mixer. The granulation step was carried out according to the procedure described in example 1 using 200 g of zeolite. The granulated powder was dried in a fluidised bed for 15 minutes and sieved to remove any particles larger than 0.5 mm diameter.

EXAMPLE 3

Isobutyltrimethoxysilane

Granules were prepared using the process described in Example 1 but using isobutyltrimethoxysilane component and the polyvinyl alcohol solution (Mowiol 4/88,). An emulsion made of 52.5 g of the organosilane, 52.5 g of a 20% solution of Mowiol 4/88 was prepared by mixing the different components with a rotor/stator mixer. The resultant emulsion is poured onto 200 g of zeolite under agitation. The granulated powder was dried in a fluidised bed for 15 minutes and sieved to remove any particles larger than 0.5 mm diameter.

EXAMPLE 4

Hydrolysed Silane: Methylmethoxysiloxane with Methyl Silsesquioxane 200 g of zeolite (DOUCIL 4A from INEOS), was placed into a domestic kitchen food mixer. 80.8 grams reactive silicone resin comprising methylmethoxysiloxane with methyl silsesquioxane was mixed in 40.4 g of a polyvinyl alcohol solution 20% solid (Mowiol 4/88) were mixed for 3 minutes with a rotor/stator mixer (Ultraturrax). The resultant creamy emulsion was poured over the zeolite in the food mixer under agitation. The granulated powder was dried in a fluidised bed for 15 minutes and sieved to remove any particles larger than 0.5 mm diameter.

EXAMPLE 5

Polydimethylsiloxane

Granules were prepared using the process described in Example 1 but using a silanol end-blocked polydimethylsiloxane of viscosity at 25° C. about 100 mm2/s. as the polyorganosiloxane component. An emulsion made of 14.6 g of the silanol ended polydimethylsiloxane, 7.3 g of a 25% solution of Mowiol 4/88 and 7.3 g of water was prepared by mixing the different components with a rotor/stator mixer. The resultant emulsion is poured onto 50 g of zeolite under agitation. The granulated powder was dried in a fluidised bed for 15 minutes and sieved to remove any particles larger than 0.5 mm diameter.

EXAMPLE 6

Octyltriethoxysilane/Polydimethylsiloxane

Powders were prepared by pouring an emulsion made of silanol end-blocked polydimethylsiloxane of viscosity at 25° C. about 70 mm2/s (25 g), n-octyl triethoxysilane sold under the trade mark Dow Corning Z-6341 (25 g), 50 g of 20% solution of Celvol 502 PVA from Celanese onto 200 g of zeolite from Ineos under agitation. The granulated powder was dried in a fluidised bed for 2 minutes at 60° C. and sieved to remove any particles larger than 0.5 mm diameter.

Preparation of the Modified Gypsum-Based Blocks

A mixture of 298 g of MP 75 gypsum powder from Knauf, 195 g of water and from 4 to 8 g of powdered additive in accordance with present invention (which equates to approximately 0.25% to 0.5% by weight of active material vs the total dry gypsum weight) was introduced into a laboratory plastic container and mixed with a laboratory mixer to homogenize the powder blend till homogenous blends was obtained. The quantity of powdered additive added for each experiment was calculated according to the actual silicone or silane content of the powder, such as to reach 0.25, 0.5 or 1.0% of active material in the dry gypsum composition. The exact weight of powdered additive for each example is given in Table 1.

The following tests were run on the above gypsum materials according to the invention, on a control sample containing no hydrophobing agent.

The dry gypsum powder mixture which had been prepared had sufficient water added thereto and the resulting wet mixture for each sample was then poured into a pre-prepared test piece mould measuring 100×100×10 mm. The test piece was removed from the mould after 24 hours and allowed to dry in the lab for a further period of 48 hours at a temperature of between 16 to 24° C. and at 50% relative humidity.

After this 3 days setting period, the test pieces were further dried overnight in an oven at 40° C. Dry blocks were weighed (Wdry) and then immersed for a period of two hour in water, with the top surface of the block at a depth of 3 cm below the water surface. After two hours immersion, the block was reweighed (Wwet). Results in Table 1 are obtained by use of the following equation wherein:

$$\text{Percentage Water Pick Up}(WPU\ \%) = \frac{(Wwet) - (Wdry) \times 100}{(Wdry)}$$

Average of three individual measurements are given in table 1.

TABLE 1

| Sample Type | Weight of powder added (g) for 100 g of gypsum | % of active vs dry gypsum | 2 hours immersion water uptake (% WPU) | Active material |
|---|---|---|---|---|
| Control | 0 | 0 | 28.6 | |
| Example 1 | 1.3 | 0.25 | 9.5 | octyl trimethoxysilane |
| Example 1 | 2.6 | 0.5 | 6.4 | |
| Example 1 | 5.3 | 1.0 | 5.0 | |
| Example 2 | 2.0 | 0.4 | 5.6 | methoxy terminated siloxane |

TABLE 1-continued

| Sample Type | Weight of powder added (g) for 100 g of gypsum | % of active vs dry gypsum | 2 hours immersion water uptake (% WPU) | Active material |
|---|---|---|---|---|
| Example 2 | 2.4 | 0.5 | 3.4 | |
| Example 2 | 4.9 | 1.0 | 2.9 | |
| Example 3 | 2.3 | 0.5 | 5.4 | isobutyltriethoxy silane |
| Example 3 | 4.6 | 1.0 | 9.0 | |
| Example 4 | 2.0 | 0.3 | 3.4 | methyl methoxysiloxane |
| Example 4 | 3.4 | 0.5 | 3.1 | |
| Example 4 | 6.8 | 1.0 | 3.8 | |
| Example 5 (comparative) | 5.6 | 1.0 | 27.7 | PDMS |
| Example 6 | 5 | 1.0 | 13.1 | octyltriethoxysilane + PDMS |
| Powder G from Wacker | 2 (=max recommended amount) | unknown | 7.7 | coated calcium oxide-alkylsilicone resin with alkoxy groups |

The water pick up on the gypsum samples containing the powder in accordance with the present invention, especially those were the active component includes an alkoxy group, gave significantly improved initial hydrophobicity results compared to the control. The initial hydrophobicity results of the powder in accordance with the present invention were improved over granules containing octyltriethoxysilane and PDMS as active component.

The table shows the water uptake of gypsum blocks modified with various percentages of different granules. It is to be understood that low water uptake value (<10 water uptake) were only obtained with the most effective granules, such as those prepared according to the invention. Water uptake as low as 3% can be obtained with granules prepared according to the invention compared with the high water uptake value (28.6%) of a reference gypsum block, not modified with hydrophobic powder.

Ease of Dispersion of the Powder in Water

Ease of dispersion of the powder in water was tested using the following procedure. Test 1: 50 g of water is poured into a transparent plastic container. 1 g of powder is gently deposited at the surface of water. Wetting of the powder and further dispersion into water is assessed visually.

Test 2: 50 g of water is poured into a transparent plastic container. 1 g of powder is gently deposited at the surface of water. The closed bottle is gently shaken for 10 seconds and the amount of powder wetted and or dispersed into water after 1 min is evaluated visually.

Test 3: 50 g of water is poured into a transparent plastic container. 1 g of powder is gently deposited at the surface of water. The closed bottle is vigorously shaken and the amount of powder wetted and or dispersed into water after 1 min is evaluated visually.

TABLE 2

| | Wetting of powder after 1 min. | Powder wetting with 10 sec of gentle shaking | Powder wetting with 2 min. of thorough shaking |
|---|---|---|---|
| Example 1 | >25% | >50% | >75% |
| Example 2 | >25% | >50% | >75% |
| Octyl triethoxy | 0% | 0% | 0% |

TABLE 2-continued

| | Wetting of powder after 1 min. | Powder wetting with 10 sec of gentle shaking | Powder wetting with 2 min. of thorough shaking |
|---|---|---|---|
| silane adsorbed on silica | | | |
| Powder G from Wacker | 0% | 0% | 0% |

It is to be understood that low percentage of wetting by water results from very hydrophobic surface of the granules and leads to poorer workability of the gypsum/powder blends, which is undesired for the final gypsum dry mix user.

The granules prepared in accordance with the present invention were better wetted by water than powder G or another powder prepared by simply spraying octyltriethoxysilane on silica. The latter powder was prepared in such a way that no binder/encapsulant is used, leading to very hydrophobic surface of the powder and very poor wetting by water. This last example demonstrated the benefit of the process of making described in this document for improved ease of dispersion in water.

Drop Entry Time

A 200 microliter water droplet is gently deposited on the modified gypsum block surface with a micropipette. The time need to have the water droplet completely absorbed by the gypsum surface is recorded and the average of 5 independent measurements is calculated. The measurements are made by depositing drops of water on both side of the gypsum block, which are referred ad the air side and the mould side.

In the case of the control test piece, the drop reduced rapidly and was fully absorbed in a couple of seconds by the test piece, whereas the 200 microliter droplet of water placed on the unwetted test pieces comprising powder from the different examples in accordance with the present invention resulted in much longer absorption time (which translated in much longer drop entry time, as reported in table 3). It is to be understood that the higher the value of the drop entry time, the more water repellent the surface. Drop entry time of 1 minute or less are due to very poor hydrophobic treatment of the gypsum block surface. Large differences between the drop entry times measured on the air and mould side result from either uneven distribution of the powder within the gypsum paste or migration of the active during the gypsum setting. Both cases are undesired because they lead to uneven quality of the bulk hydrophobic treatment.

TABLE 3

| Sample Type | Weight of powder added (g) for 100 g of gypsum | Drop entry time: air side (minutes) | Drop entry time: mould side (minutes) |
|---|---|---|---|
| Control | 0 | 5 seconds | 5 seconds |
| Example 1 | 2.0 | >60 | 7 |
| Example 2 | 2.0 | >60 | >60 |
| Example 3 | 2.0 | >60 | >60 |
| Powder G | 2.0 | 1 | >60 |

Granules according to examples 1 to 3 gave very good repellent surface on both sides of gypsum block as compared to untreated control. Powder G gave good water repellent surface on mould side but poor on air side.

The invention claimed is:

1. A gypsum material in powder form, comprising dry gypsum and a granulated hydrophobing additive comprising a carrier particle on which is deposited an organosilicon component, a binder polymer and an emulsifier for the organosilicon component wherein the organosilicon component comprises at least one alkoxy group and is free of organopolysiloxane having Si bonded hydrogen, and the carrier particle is of a nature different from silica or lime, wherein said gypsum material comprises said granulated hydrophobing additive in an amount sufficient to give from 0.01 to 2% by weight of the organosilicon component based on the weight of the dry gypsum, wherein the organosilicon component comprises a resinous organopolysiloxane having at least 10% of the siloxane units as tri- or tetra-functional units.

2. A gypsum material according to claim 1 wherein the carrier particle is selected from the group of silicates, calcium carbonates, calcium magnesium carbonate, methyl cellulose, carboxy methyl cellulose, polystyrene beads, sulphates, magnesium oxide, diatomite or calcinated diatomite, calcinated rice and starch residues, and stearates.

3. A gypsum material according to claim 1 wherein the emulsifier and the binder are polyvinyl alcohol.

4. A gypsum material according to claim 1 wherein the weight ratio of binder versus organosilicon component is comprised between 10:100 and 50:100.

5. A gypsum material according to claim 1 wherein the organosilicon component comprises alkoxysilyl groups and akylsilyl groups.

6. A gypsum material according to claim 1 wherein the organosilicon component further comprises a silane, an organosiloxane, a condensation product of a silane compound, or a mixture thereof.

7. A gypsum material according to claim 1 wherein the organosilicon component further comprises a compound of the formula $Si(OZ')_4$, $ZSi(OZ')_3$ or $Z_2Si(OZ')_2$ in which Z represents an alkyl, substituted alkyl, aryl or substituted aryl group having 1 to 20 carbon atoms, and each Z' represents an alkyl group having 1 to 6 carbon atoms and/or a condensation compound obtained by the hydrolysis-condensation of any combination of compounds of the formula $Si(OY')_4$, $YSi(OY')_3$ or $Y_2Si(OY')_2$ in which Y represents an alkyl, substituted alkyl, aryl or substituted aryl group having 1 to 20 carbon atoms and each Y' represents an alkyl group having 1 to 6 carbon atoms.

8. A gypsum material according to claim 1 wherein the organosilicon component comprises alkoxysilyl groups having 1 or 2 carbon atoms.

9. A gypsum material according to claim 1 wherein the carrier has a mean particle size of 0.1 to 50 micrometers.

10. A process for imparting to gypsum material a hydrophobic character, said process comprising mixing into the gypsum material a granulated hydrophobing additive, the granulated hydrophobing additive comprising a particulate carrier different from silica or lime on which is deposited an organosilicon component free of organopolysiloxane having Si bonded hydrogen, a binder polymer, and an emulsifier for the organosilicon, wherein the organosilicon component comprises a resinous organopolysiloxane having at least 10% of the siloxane units as tri- or tetra-functional units.

11. A process for imparting to gypsum material a hydrophobic character according to claim 10 wherein the carrier particle is selected from the group of silicates, calcium carbonates, calcium magnesium carbonate, methyl cellulose, carboxy methyl cellulose, polystyrene beads, sulphates, magnesium oxide, diatomite or calcinated diatomite, calcinated rice and starch residues, and stearates.

12. A process for imparting to gypsum material a hydrophobic character according to claim 10 wherein the emulsifier and the binder are polyvinyl alcohol.

13. A process for imparting to gypsum material a hydrophobic character according to claim 10 wherein the weight ratio of binder versus organosilicon component is comprised between 10:100 and 50:100.

14. A process for imparting to gypsum material a hydrophobic character according to claim 10 wherein the organosilicon component comprises alkoxysilyl groups and akylsilyl groups.

15. A process for imparting to gypsum material a hydrophobic character according to claim 10 wherein the organosilicon component further comprises a silane, an organosiloxane, a condensation product of a silane compound, or a mixture thereof.

16. A process for imparting to gypsum material a hydrophobic character according to claim 10 wherein the organosilicon component further comprises a compound of the formula $Si(OZ')_4$, $ZSi(OZ')_3$ or $Z_2Si(OZ')_2$ in which Z represents an alkyl, substituted alkyl, aryl or substituted aryl group having 1 to 20 carbon atoms, and each Z' represents an alkyl group having 1 to 6 carbon atoms and/or a condensation compound obtained by the hydrolysis-condensation of any combination of compounds of the formula $Si(OY')_4$, $YSi(OY')_3$ or $Y_2Si(OY')_2$ in which Y represents an alkyl, substituted alkyl, aryl or substituted aryl group having 1 to 20 carbon atoms and each Y' represents an alkyl group having 1 to 6 carbon atoms.

17. A process for imparting to gypsum material a hydrophobic character according to claim 10 wherein the organosilicon component comprises alkoxysilyl groups having 1 or 2 carbon atoms.

18. A process for imparting to gypsum material a hydrophobic character according to claim 10 wherein the carrier has a mean particle size of 0.1 to 50 micrometers.

* * * * *